United States Patent Office 3,352,947
Patented Nov. 14, 1967

3,352,947
POLYOL POLY(HYDROGEN ALKYL PHOSPHITE) MONOMERS
Baak W. Lew, Wilmington, Del., assignor to Atlas Chemical Industries, Inc., Wilmington, Del., a corporation of Delaware
No Drawing. Filed Jan. 14, 1964, Ser. No. 337,517
8 Claims. (Cl. 260—928)

ABSTRACT OF THE DISCLOSURE

Polyol poly(hydrogen alkyl phosphite) monomers. The monomers may be prepared by reacting at least two mols of dialkyl hydrogen phosphites with one mol of polyhydric alcohols. The monomers are useful as flame retardants for resins.

The present invention relates to novel polyol phosphites, their method of manufacture, and to resin compositions containing such phosphites.

The use of organic phosphates and phosphites as flame-retardant agents in the production of various resin compositions is well known in the chemical art. Previously, the phosphates and phosphites suggested by this use generally consisted of polymeric materials. A readily pourable liquid flame-retardant composition capable of easy mixing with other resin components is highly desired and sorely needed in the resin art. A polymerized flame-retardant component is not suited to use in the common resin mixing operation which utilizes a nozzle-head because of the innate insolubility and resistance to flow of a polymer.

In accord with the present invention a polyol alkyl hydrogen phosphite containing a plurality of alkyl hydrogen phosphite radicals is produced by the reaction of a polyhydric alcohol and a dialkyl hydrogen phosphite. The components are mixed together and heated. Preferably a molar ratio of at least 2 moles of a dialkyl phosphite per mole of polyhydric alcohol is utilized. Usually ratios higher than about 10 moles of dialkyl phosphite per mole of polyhydric alcohol yield no noticeable advantages over lesser ratios. Reaction temperatures of about 100° C. and higher generally cause the reaction to proceed at a practiceable rate. Temperatures over about 220° C. are not conducive to the production of the present monomer product. A time period of 0.5 hour or longer is generally needed to complete the reaction. Generally reaction times of over 5 hours substantially lower the yield of the present monomer product. The evolution during the reaction of one mole of alcohol for each mole of dialkyl hydrogen phosphite starting material which is reacted indicates the production of a non-polymeric, non-cyclic phosphite ester containing one unreacted alkyl group remaining on the phosphite portion of the ester. The ester product may be recovered from the reaction mixture by distillation of the unreacted dialkyl hydrogen phosphite. The non-polymeric non-cyclic properties of the product is easily recognized by the ease of flow, fluidity, of the product. The non-cyclic property of the present polyol phosphites permits a higher phosphorous content in the polyol phosphite product. The latter characteristic is highly useful in improving the flame-proofing property of subsequently produced resin products. The polyhydric alcohol component may be, for example, alkyl or aryl, and may be substituted. Specific examples of alcohols which are aptly suited are: ethylene glycol, glycerol, tetritols, hexitols, butanediols and pentachlorophenoxyglycerol.

The dialkyl hydrogen phosphite component of the present invention is suitably one amenable to alcoholysis. Generally such phosphites containing up to 6 carbon atoms in each alkyl group are suited to use in the present invention. However, generally as the carbon length increases, reactivity rapidly decreases. Thus, in order to maintain a high level of reactivity it is preferred to utilize a dialkyl hydrogen phosphite component which contains from 1 to 3 carbon atoms in each of the alkyl groups. The alkyl portion of the dialkyl hydrogen phosphite component may be either saturated or unsaturated. The product of the present invention is a polyol alkyl hydrogen phosphite monomer. The alkyl group remaining attached to the hydrogen phosphite portion of the product preferably contains from 1 to 6 carbon atoms.

Generally the present reaction may be carried out without the aid of a catalyst, yields may generally be improved by the employment of an alkaline catalyst, for example, metallic sodium, metallic potassium, and their hydroxides, oxides and hydrides.

Although the present reaction is preferably carried out in the absence of a solvent, avoiding subsequent separation and solvent recovery steps, carrying out the reaction in solvent may be useful in some circumstances and may readily be done. Generally the lower alcohols, such as, ethanol and methanol, are useful and suitably a lower alcohol solvent may be matched with an alkyl group on the dialkyl hydrogen phosphite component thus utilizing a portion of the byproduct alcohol produced and lessening the problem of solvent separation.

The present polyol alkyl hydrogen phosphites are useful flame retardant components in resins.

For example, the present phosphite materials are useful components of epoxy resins. Typical epoxy resins are those produced by the reaction of a compound containing one or more epoxy groups, e.g., epichlorhydrin or glyceryl dichlorhydrin with a polyhydric material, e.g., bisphenol A or resorcinol, in the presence of a curing agent such as a diamine, dibasic anhydride, polyamine, and polysulfide. The present phosphite materials may be utilized to replace all or part of the curing agent, and may be incorporated in an epoxy resin composition by simply adding the phosphite material as a separate component as the various components of the epoxy resin are mixed or in admixture with any component of the resin in which the phosphite is compatible. Epoxy resins containing one of the present phosphite components are found to be highly flame retardant and are both intumescent and self-extinguishing. In addition epoxy resins which include one of the present phosphite components are generally found to have improved color characteristics. Although even small amounts of the present phosphites show some advantages in epoxy resins, generally less than 5% by weight yields a product having less than a readily noticeable improvement. Generally more than 75% of the present phosphites in an epoxy resin improves flame and heat-resisting characteristics only through the diminution of other usually desirable characteristics, such as, curing and cohesiveability. The present phosphite materials also provide a convenient means of incorporating a halogen component in an epoxy resin component by merely using a halogenated polyol as a component of the phosphite. Frequently, halogen atoms are utilized in epoxy resin compositions to yield a product which has improved flame and fire-resistant properties.

The present phosphite materials are useful additives to polyurethane resin compositions. Generally polyurethane resins are prepared from: (1) a polyether or polyester resin, e.g., a relatively low molecular weight polymer, such as, polyethylene adipate, or polyoxypropylene glycol; (2) a diisocyanate component, e.g. toluene diisocyanate, and bis(4-isocyanate phenyl) methane, and; (3) a small amount of a chain extender such as water or a low molecular weight diol. The diisocyanate reacts with the resin component and the chain extender converting the relatively low molecular weight resin into a high molecular weight cross-linked elastomer or plastic containing urethane linkages.

The present phosphite materials may be incorparted in polyurethane resin compositions by simply adding the phosphite material along with any compatible resin component or by separately adding the phosphite along with the various resin components as the resin composition is mixed. Polyurethane foam, a particularly popular form of polyurethane resin, is rendered flame retardant by the addition of the present polyol-phosphites. The present polyol-phosphites may be utilized as the sole reactant with a polyisocyanate component or in conjunction with the usual polyester or polyether components used in polyurethane resins. Polyurethane resins compounded to include one of the present phosphites have excellent flame retardant and self-extinguishing characteristics. Generally less than 25% yields a product having less than a readily noticeable improvement. Usually more than 75% of the present phosphites in a polyurethane resin further improves the flame retardant and self-extinguishing characteristics only through the diminution of other usually desired characteristics, such as, curing and foaming. The present phosphite materials also provide a convenient means of incorporating a halogen component in a polyurethane resin composition by merely using a halogenated polyol as a component of the phosphite. In a manner similar to the epoxy resins described above halogen atoms are frequently utilized in polyurethane compositions to yield a product which has improved flame and fire-resistant properties.

The following examples are illustrative of the present invention:

Example 1

50 grams of sorbitol (0.3 mole) were mixed with 303 grams of diethyl hydrogen phosphite (2.2 moles) containing 0.4 gram of sodium as a catalyst in a suitable distillation vessel. The mixture was heated with stirring. At 133° C. distillation began. The temperature was allowed to slowly rise until after 2 hours and 20 minutes it had risen to 202° C. and a total of 83 grams of distilled material had been collected. The reaction mixture was then cooled and the excess diethyl hydrogen phosphite was removed by maintaining the mixture at a temperature of 60° C. and at a vacuum of from 0.5 to 1.0 mm. of mercury for a period of 3 hours. The resulting product remaining in the distillation vessel was a mobile almost colorless liquid. A redistillation and anaysis of the volatile material from the product removed by the original distillation indicated that 5.8 moles of ethyl alcohol had been removed for each mol of sorbitol. The amount of unreacted diethyl hydrogen phosphite recovered from the reaction mixture indicated that 5.7 moles of diethyl hydrogen phosphite had reacted with each mole of sorbitol. Thus giving a ratio of about 1 between the moles of ethyl alcohol produced and the number of moles of diethyl hydrogen phosphite reacted. These values indicate the predominant product was sorbitol hexa(hydrogen ethyl phosphite). The yield was 193 grams or 94% of theoretical.

Example 2

90.1 grams of 1,4-butanediol (1 mole) and 304.0 grams of diethyl hydrogen phosphite (2.2 moles) were mixed in a suitable distillation vessel and the mixture heated to 136° C. over a period of 1 hour with constant stirring. The mixture was then cooled and vacuum distilled at 35–40° C. for 15 minutes at 9 mm. of mercury, then at 35–40° C. for 45 minutes at 0.6 mm. to remove any unreacted diethyl hydrogen phosphite. The product was a low viscosity colorless liquid. A redistillation of the volatile material from the initial distillation step showed that 2.1 moles of ethyl alcohol was formed per mole of 1,4-butanediol. The amount of unreacted diethyl hydrogen phosphite recovered showed that 2.0 moles of diethyl hydrogen phosphite had reacted per mole of 1,4-butanediol giving a ratio of 1.1 moles of ethyl alcohol produced per mole diethyl hydrogen phosphite reacted. These results are indicative that the reaction product was predominantly 1,4-butanediol bis(hydrogen ethyl phosphite). The yield was 271 grams or 99% of theoretical for this compound.

Example 3

100 grams of sorbitol (0.55 mole) were mixed with 80 grams of methyl alcohol and 121 grams of dimethyl hydrogen phosphite (1.1 moles) in a suitable distillation vessel. The mixture was heated with constant stirring. At a temperature of 77° C. distillation of methyl alcohol began. The temperature was then allowed to rise slowly to 120° C. over a period of 1.5 hours. 120 grams of distillate were collected. The distillate was redistilled to yield 112 grams of methyl alcohol. This accounted for 1.8 moles of methyl alcohol which were removed for each mole of sorbitol used and 0.9 mole of methyl alcohol per mole of dimethyl hydrogen phosphite used. The product was therefore indicated to be predominantly sorbitol bis (hydrogen methyl phosphite).

Example 4

60 grams of pentaerythritol (0.44 mole) were reacted with 365 grams of diethyl hydrogen phosphite (2.64 moles) by heating the two components together with constant stirring in a distillation vessel. At 130° C. distillation began and was continued for a period of 3 hours and 10 minutes during which time the temperature was allowed to rise to 199° C. 90 grams of distillate were collected. The reaction product was then cooled and vacuum stripped to remove any unreacted diethyl hydrogen phosphite. The remaining product was an almost colorless low viscosity liquid. The reaction consumed 4 moles of diethyl hydrogen phosphite per mole of pentaerythritol and released 4 moles of ethyl alcohol in the process. This was indicative that the predominant product was pentaerythritol tetra(hydrogen ethyl phosphite). The yield of product was 220 grams or 99% of the calculated yield.

Example 5

100 grams of dipentaerythritol (0.39 mole) were reacted with 346 grams of dimethyl phosphite (3.14 moles) by heating the components together with constant stirring in a distillation vessel. At 130° C. distillation began and was continued for 1.5 hours allowing the temperature to rise over that period to 189° C. 105.6 grams of distillate were collected. The reaction mixture was then cooled and vacuum stripped to remove any unreacted dimethyl hydrogen phosphite. The product remaining in the flask was a very lightly colored viscous liquid. The distillate was redistilled and found to contain 74 grams of methyl alcohol. Thus 5.9 moles of methyl alcohol were produced per mole of dipentaerythritol reacted. The amount of recovered unreacted dimethyl hydrogen phosphite was 86 grams, which indicated that 6 moles of methyl hydrogen phosphite had reacted with each mole of dipentaerythritol and that each mole of dimethyl hydrogen phosphite had yielded one mole of methyl alcohol. Thus the major reaction product was indicated to be dipentaerythritol hexa-(hydrogen methyl phosphite). The yield was 284 grams or 99.2% of the calculated theoretical yield.

Example 6

50 grams of 1-pentachlorophenoxyglycerol (0.15 mole) were reacted with 48.6 g. of dimethyl hydrogen phosphite (0.44 mole) by heating with constant stirring in a suitable distillation vessel. Distillation began at 140° C. The reaction was continued for 1.5 hours while the temperature was raised slowly to 192° C. The reaction mixture was cooled and then was vacuum stripped to remove excess unreacted dimethyl hydrogen phosphite. The product remaining in the flask was a slightly yellow viscous sirup. A redistillation of the distillate obtained during the reaction indicated that 1.7 moles of methyl alcohol were evolved per mole of 1-pentachlorophenoxyglycerol reacted and 2.1 moles of dimethyl hydrogen phosphite had reacted with each mole of 1-pentachlorophenoxyglycerol. Thus 0.8 mole of methyl alcohol was produced per mole of dimethyl hydrogen phosphite reacted. The yield was 74.5 g. or 102% of theoretical. The major reaction product was indicated to be 1-pentachlorophenoxyglycerol bis-(hydrogen methyl phosphite).

*Example 7*

5.0 grams of Epon 828, 2.0 grams of the product of Example 1, and 0.2 grams of N-methyl morpholine were heated in an oven at a temperature of 120° C. for a period of 21 hours. The product after removal from the oven and cooling was a hard, almost water-white resin. The resin product was then subjected to the flame of a Bunsen burner and found to be intumescent. Upon removal from the flames the product was found to be immediately self-extinguishing. A control test with Epon 828 without the addition of the product of Example 1, yielded an orange-brown resin which was highly inflammable and was not self-extinguishing when removed from the burner flame.

*Example 8*

Example 7 was repeated except that 2.0 grams of the product of Example 2 were utilized instead of the product of Example 1. The resulting resin product had similar physical characteristics and exhibited similar properties as the resin product of Example 7.

*Example 9*

Example 7 was repeated except that 2.0 grams of the product of Example 3 were utilized instead of the product of Example 1. The resulting resin product had similar physical characteristics and exhibited similar properties as the resin product of Example 7.

*Example 10*

1.0 gram of the product of Example 1, 1.0 gram of a 65%:35% mixture by weight of 2,4-toluene diisocyanate and 2,6-toluene diisocyanate, 0.08 gram of N-methyl morpholine, and one drop of Silicone 200 (100 cps.) were placed in a beaker and mixed together by stirring for a period of 3 minutes. One drop of water was then added to the mixture and the mixture stirred for an additional half minute. Another drop of water was then added, stirred in for a half minute and the mixture allowed to foam. In one-half hour a rigid foam was formed. A sample of this foam was ignited in the flame of a Bunsen burner. When the sample was removed from the burner flame it was found to be almost immediately self-extinguished. A second sample of foam was similarly prepared without the addition of the product of Example 1. When flame tested this sample continued to burn when removed from the flame until it was entirely consumed.

What is claimed is:

1. A polyol poly(hydrogen alkyl phosphite) monomer containing from 1 to 6 carbon atoms in each of the said alkyl groups.
2. The polyol poly(hydrogen alkyl phosphite) monomer of claim 1 which is sorbitol hexa(hydrogen ethyl phosphite).
3. The polyol poly(hydrogen alkyl phosphite) monomer of claim 1 which is butanediol bis(hydrogen ethyl phosphite).
4. The polyol poly(hydrogen alkyl phosphite) monomer of claim 1 which is sorbitol bis(hydrogen methyl phosphite).
5. The polyol poly(hydrogen alkyl phosphite) monomer of claim 1 which is pentaerythritol tetra(hydrogen ethyl phosphite).
6. The polyol poly(hydrogen alkyl phosphite) monomer of claim 1 which is dipentaerythritol hexa(hydrogen methyl phosphite).
7. The polyol poly(hydrogen alkyl phosphite) monomer of claim 1 which is pentachlorophenoxyglycerol bis(hydrogen methyl phosphite).
8. A process of preparing a polyol poly(hydrogen alkyl phosphite) monomer which comprises heating a mixture of a polyhydric alcohol and a dialkyl hydrogen phosphite containing from 2 to 12 carbon atoms, said mixture containing at least two mols of the dialkyl hydrogen phosphite per mol of polyhydric alcohol, at a temperature from 100° C. to 220° C. for from 0.5 to 5 hours.

References Cited

UNITED STATES PATENTS 2,963,451  12/1960  Coates _____ 260—928 X
3,170,902  7/1965  Nagelschmidt ____ 260—928 X

FOREIGN PATENTS 535,946  1/1957  Canada.

CHARLES B. PARKER, *Primary Examiner.*

A. H. SUTTO, *Assistant Examiner.*